United States Patent
Kuznia et al.

(10) Patent No.: US 6,779,406 B1
(45) Date of Patent: Aug. 24, 2004

(54) SELF-RETAINING PRESSURE SENSOR ASSEMBLY HAVING NOTCHED SEAL RETENTION FLANGE

(75) Inventors: Philip D. Kuznia, Carmel, IN (US); Paul J. Pitzer, Kokomo, IN (US); Clyde H. Johnson, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 46 days.

(21) Appl. No.: 10/357,715

(22) Filed: Feb. 4, 2003

(51) Int. Cl.⁷ .................................................. G01L 7/00
(52) U.S. Cl. .......................................... 73/756; 73/706
(58) Field of Search ................................... 73/700–756

(56) References Cited

U.S. PATENT DOCUMENTS

| | | |
|---|---|---|
| 4,756,193 A | 7/1988 | Luettgen |
| 4,850,227 A | 7/1989 | Luettgen et al. |
| 5,209,122 A | 5/1993 | Matly et al. |
| 5,317,924 A | 6/1994 | Maack |
| 5,377,403 A | 1/1995 | Hart, Jr. et al. |
| 5,942,691 A | 8/1999 | Hopkins et al. |
| 6,050,147 A | 4/2000 | Viduya et al. |
| 6,227,055 B1 | 5/2001 | Pitzer |

*Primary Examiner*—Edward Lefkowitz
*Assistant Examiner*—Jermaine Jenkins
(74) *Attorney, Agent, or Firm*—Jimmy L. Funke; Stefan V. Chmielewski

(57) ABSTRACT

An improved self-retaining pressure sensor assembly includes a pressure sensor having a housing, a depending ported stem terminated in an enlarged foot, and a flanged resilient seal disposed about the stem between the pressure sensor housing and foot, with the seal flange having one or more notches about its circumferential periphery to ease insertion and extraction of the assembly with respect to a circular opening formed in a pressure vessel. The notches reduce the effective area of the flange, proportionately decreasing the force (insertion force) needed to insert the assembly at the time of installation and the force (extraction force) needed to subsequently remove the assembly for repair or replacement. The number and size of the notches can be adjusted to provide acceptable insertion and extraction forces, without lubricant, while not significantly compromising the self-retention capability of the assembly.

5 Claims, 2 Drawing Sheets

# SELF-RETAINING PRESSURE SENSOR ASSEMBLY HAVING NOTCHED SEAL RETENTION FLANGE

TECHNICAL FIELD

This invention relates to a pressure sensor assembly including a resilient seal for sealing a pressure vessel opening and retaining the pressure sensor in the opening, and more particularly to a seal that provides reduced and controlled insertion and extraction forces.

BACKGROUND OF THE INVENTION

Motor vehicle engine controls sometimes require measurement of gas pressures subject to positive pressure fluctuations that tend to expel or blow out the pressure sensor. For example, the gas pressure in the intake manifold of an internal combustion engine experiences a sudden positive surge during an engine backfire. A similar condition can occur with a fuel tank vapor pressure sensor in the event of a crash. Although the usual solution in such applications is to use screw fasteners or the like to secure the pressure sensor to the wall of the pressure vessel, it has been found that the sensor can be adequately secured with significant reductions in material and assembly expense by fitting the stem of the sensor with a resilient, flexible annular seal having a retention flange that is larger than the pressure vessel opening. Such a seal is disclosed in the U.S. Pat. No. 5,317,924 to Maack, issued on Jun. 7, 1994, assigned to the assignee of the present invention, and incorporated herein by reference.

Referring to FIG. 1, the seal 10 disclosed in the aforementioned U.S. Pat. No. 5,317,924 includes a plurality of fins 12 of approximately the same diameter as the opening 14 in a pressure vessel wall 16, a retention range 18 having a diameter that is larger than the opening 14, and a central axial bore 20. The pressure sensor 22 has a ported stem 24 that terminates in an enlarged cylindrical foot 26, and the stem 24 is inserted through the seal bore 20 until the seal 10 is retained between the foot 26 and a housing 28 of the sensor 22. When the assembly is inserted into the opening 14, the retention flange 18 extends through the opening 14 and seats against the interior periphery of the pressure vessel wall 16 about the opening 14. The fins 12 prevent leakage between the seal 10 and the opening 14, and the flange 18 and foot 26 retain the sensor 22 in the opening 14 in the presence of a high positive gas pressure in the pressure vessel. When the sensor 22 must be removed for repair or replacement, it may be extracted with a suitable tool capable of exerting an extraction force sufficient to deform and compress the retention flange 18.

In usage, the insertion and extraction forces are held to reasonably low values by appropriate selection of the seal composition and by coating the seal with an oil-based lubricant prior to insertion of the pressure sensor into the pressure vessel opening. For example, the seal may be a fluorosilicone polymer, and the lubricant may be a silicone emulsion. The fluorosilicone material is very resilient and flexible by nature, and the silicone-based lubricant remains on the seal so that the extraction force is not significantly increased over time. In a typical application of the sensor depicted in FIG. 1, the average insertion force may be approximately seven pounds, while the average extraction force may be approximately eighteen pounds.

While the above-described approach has been successfully used in automotive applications for several years, newly proposed emission regulations severely restrict the use of fluorosilicone materials and silicone emulsion lubricants in engine applications. For example, many manufacturers now specify the use of fluorocarbon instead of fluorosilicone, and only water-based lubricants. Unfortunately, fluorocarbon is less flexible than fluorosilione, and water-based lubricants tend to evaporate over time. As a result, the force required to extract a sensor equipped with a fluorocarbon seal is unacceptably high. Also, it would be desirable from a cost standpoint to eliminate the seal lubricant entirely. Accordingly, what is needed is a seal design that will permit the use of relatively stiff material such as fluorocarbon and no lubricant, and still provide acceptably low insertion and extraction forces.

SUMMARY OF THE INVENTION

The present invention provides an improved self-retaining pressure sensor assembly including a pressure sensor having a housing and a depending ported stem terminated in an enlarged foot and a flanged resilient seal disposed about the stem between the pressure sensor housing and foot, wherein the seal flange has one or more notches about its circumferential periphery to ease insertion and extraction of the assembly with respect to a circular opening formed in a pressure vessel. The notches reduce the effective area of the flange, proportionately decreasing the force (insertion force) needed to insert the assembly at the time of installation and the force (extraction force) needed to subsequently remove the assembly for repair or replacement. The number and size of the notches can be adjusted to provide acceptable insertion and extraction forces, without lubricant, while not significantly compromising the self-retention capability of the assembly.

DESCRIPTION OF THE PREFERRED EMBODIMENT

Figure 3:
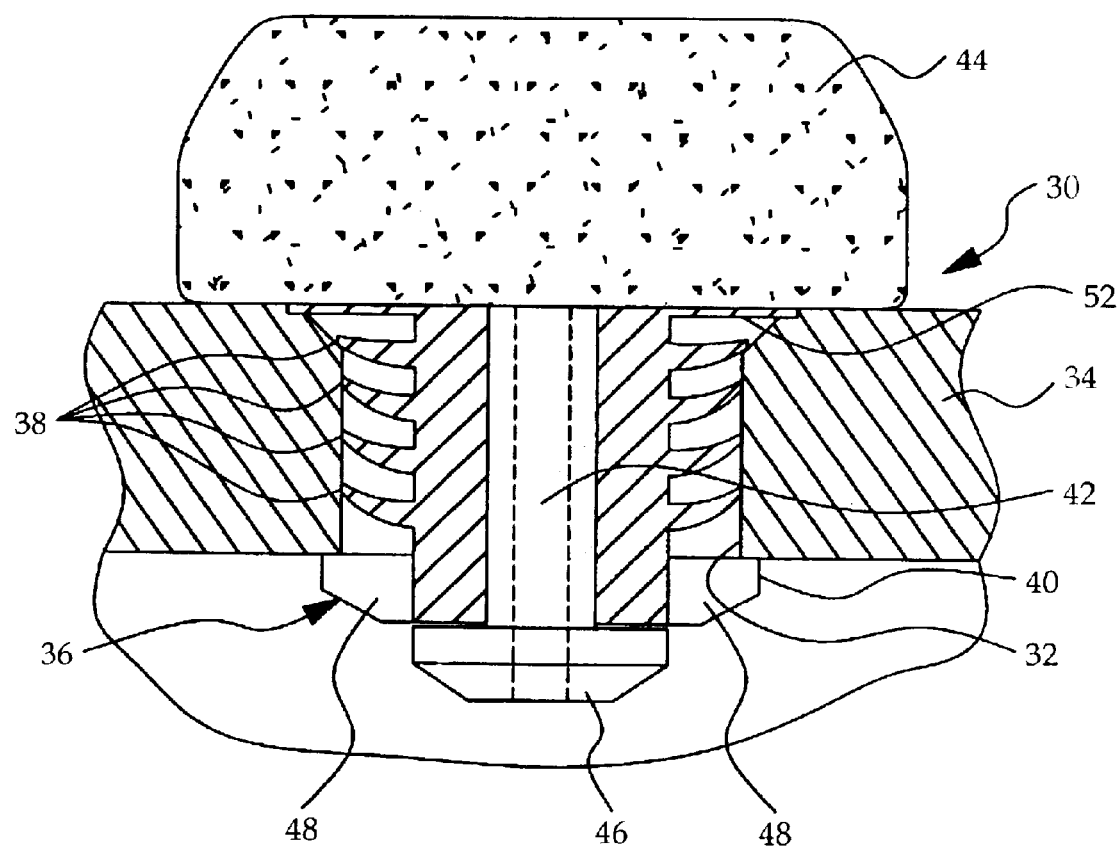
FIG. 3 is a cross-sectional view of a fully assembled pressure sensor and seal according to this invention.

Referring to FIG. 3, the reference numeral 30 generally designates the pressure sensor assembly of the present invention as installed in an circular opening 32 formed in a pressure vessel wall 34. As mentioned above, the pressure vessel wall 34 may be the intake manifold of an internal combustion engine or a motor vehicle fuel tank, for example. In either case, the gaseous medium constrained by the wall 34 is subject to sudden positive pressure surges that tend to expel the sensor assembly 30 from the opening 32.

Figure 1:
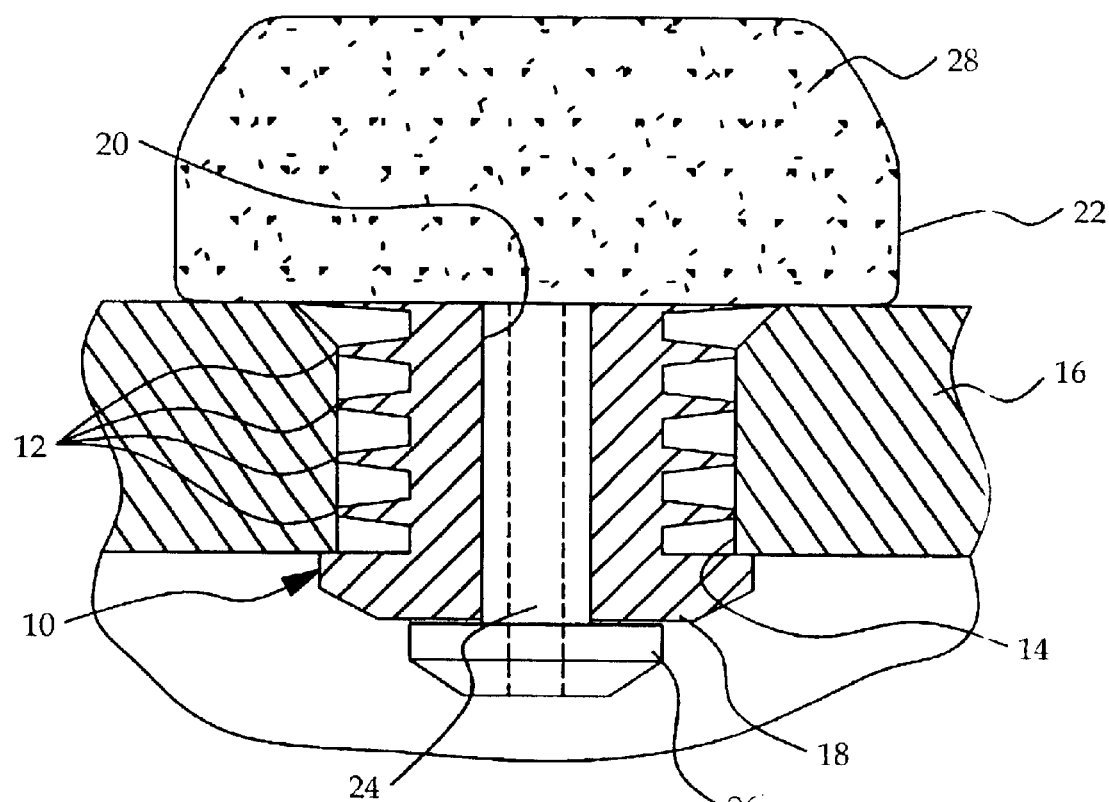
FIG. 1 is an isometric view of a prior art self-retaining pressure sensor and seal.

As with the prior art pressure sensor assembly depicted in FIG. 1, the pressure sensor assembly 30 depicted in FIG. 3 includes a resilient, flexible seal 36 that serves the dual purpose of sealing the constrained medium from the ambient pressure and retaining the assembly 30 within the pressure vessel wall 34 during positive pressure surges of the constrained medium. In particular, the fins 38 of seal 36 provide a seal between the constrained medium and the ambient pressure, and the retention flange 40 of seal 36 seats on the interior surface of the wall 34 about the opening 32 to prevent the assembly 30 from being expelled in the event of a positive pressure surge of the constrained medium. Also as in FIG. 1, the seal 36 is retained on a ported pressure sensor stem 42 between the pressure sensor housing 44 and a foot 46 formed on the end of stem 42. However, in the seal 36 of FIG. 3, the diameter of the fins 38 is enlarged relative to that of the fins 12 of FIG. 1, and more importantly, the retention flange 40 is provided with a plurality of notches 48 in its circumferential periphery.

Figure 2:
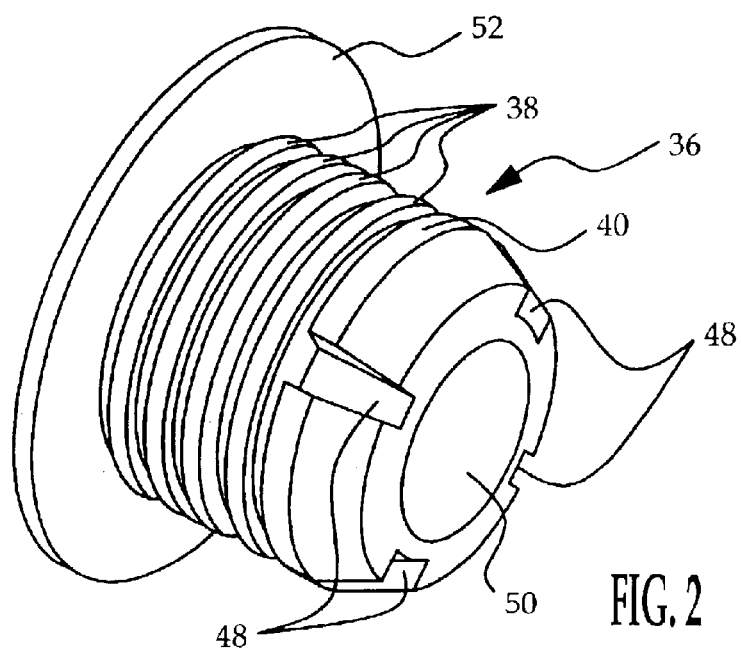
FIG. 2 is an isometric view of a pressure sensor seal according to this invention.

As best seen in the isometric view of FIG. 2, the seal 36 includes a central opening 50 for accommodating the pressure sensor stem 42, an upper flange 52 that extends in part between the pressure sensor housing 44 and the exterior periphery of the pressure vessel wall 34, the aforementioned fins 38, and the aforementioned retention flange 40. In the illustrated embodiment, the retention flange 40 has four notches 48 evenly spaced about its periphery, each subtending an angle of approximately 40 degrees. However, it will be understood that some applications may require more or fewer notches, and that the notches 48 may be wider or narrower than in the illustrated embodiment. But in any event, the notches 48 serve to reduce the effective area of the retention flange 40, allowing the assembly 30 to be inserted into the opening 32 with reduced force, and subsequently extracted with reduced force, for a seal of a given composition, as compared with the prior art seal 10 in which the flange 18 is not notched. During such insertion and extraction, the notches 48 partially collapse as the material of flange 40 is compressed, whereafter the flange material returns to its former state. The notches 48 are preferably arcuate in shape as shown, and symmetrically disposed about the periphery of the flange 40. In the illustrated embodiment, the notches 48 are sized to reduce the effective area of the retention flange 40 by approximately 45%, providing a similar percentage of reduction in the required insertion and extraction forces, compared with an assembly having a seal of the same material with an un-notched retention flange.

Due to the reduced insertion and extraction forces afforded by the notching of retention flange 40, the assembly 30 may be installed without a lubricant, and the extraction force will not increase over time, as in the case of a lubricant subject to loss by evaporation. Also, the characteristic stiffness of the seal material is no longer critical, allowing the use of non-silicone containing polymers such as fluorocarbon.

In summary, the pressure sensor assembly of the present invention contributes to reduced cost compared to the prior art sensor of FIG. 1 by eliminating the need for a lubricant to ease insertion and extraction, and by permitting a wider range of seal material selection. While the invention has been described in reference to the illustrated embodiment, it is expected that various modifications in addition to those mentioned above will occur to those skilled in the art. For example, the notches 48 may vary in number and/or shape as mentioned above, and the seal material may be different than specified for the illustrated embodiment. Accordingly, it will be understood that sensor assemblies incorporating these and other modifications may fall within the scope of this invention, which is defined by the appended claims.

What is claimed is:

1. A pressure sensor assembly for insertion in a circular opening of a pressure vessel wall, comprising:

pressure sensor having a housing and a depending ported stem terminated in an enlarged foot; and a resilient seal disposed about said stem between said housing and said foot, said seal including an integral circular flange disposed adjacent said foot and having a diameter exceeding that of said circular opening so as to retain said pressure sensor assembly in said opening when a gas pressure constrained by said wall tends to expel said pressure sensor assembly, said flange having one or more notches about its circumferential periphery to ease the insertion and subsequent extraction of said pressure sensor assembly.

2. The pressure sensor assembly of claim 1, wherein said notches are arcuate in shape.

3. The pressure sensor assembly of claim 1, wherein said flange includes a plurality of notches that are symmetrically disposed about its circumferential periphery.

4. The pressure sensor assembly of claim 1, wherein said notches are sized to control forces required for the insertion and subsequent extraction of said pressure sensor assembly.

5. The pressure sensor assembly of claim 4, wherein said notches reduce an effective area of said flange to reduce said forces required for the insertion and subsequent extraction of said pressure sensor assembly.

* * * * *